US007206755B1

(12) United States Patent
Muralidhar

(10) Patent No.: US 7,206,755 B1
(45) Date of Patent: Apr. 17, 2007

(54) METHOD, APPARATUS AND ARTICLE-OF-MANUFACTURE FOR THE CREATION, ISSUANCE, VALUATION/PRICING, TRADING AND EXERCISE OF OPTIONS FOR ATTENDANCE RIGHTS, AND DERIVATIVE INSTRUMENTS THEREON

(76) Inventor: Sanjay P. Muralidhar, 54 Silver Spring Rd., Ridgefield, CT (US) 06877

( * ) Notice: Subject to any disclaimer, the term of this patent is extended or adjusted under 35 U.S.C. 154(b) by 0 days.

(21) Appl. No.: 09/435,168

(22) Filed: Nov. 5, 1999

(51) Int. Cl.
*G06Q 10/00* (2006.01)
*G06Q 30/00* (2006.01)

(52) U.S. Cl. .............................. 705/26; 705/14; 705/5; 705/37; 235/382; 235/382.5

(58) Field of Classification Search ................... 705/5, 705/37, 14, 26; 235/382, 382.5
See application file for complete search history.

(56) References Cited

U.S. PATENT DOCUMENTS

| | | | | |
|---|---|---|---|---|
| 4,674,044 A | * | 6/1987 | Kalmus et al. | 340/825.26 |
| 4,766,539 A | * | 8/1988 | Fox | 705/4 |
| 4,903,201 A | * | 2/1990 | Wagner | 705/37 |
| 5,239,480 A | * | 8/1993 | Huegel | 705/5 |
| 5,408,417 A | * | 4/1995 | Wilder | 235/381 |
| 5,598,477 A | * | 1/1997 | Berson | 380/51 |
| 5,797,126 A | * | 8/1998 | Helbling et al. | 705/5 |
| 5,797,127 A | * | 8/1998 | Walker et al. | 705/37 |
| 5,890,138 A | * | 3/1999 | Godin et al. | 705/1 |
| 5,905,975 A | * | 5/1999 | Ausubel | 705/26 |
| 5,948,040 A | * | 9/1999 | DeLorme et al. | 340/990 |
| 5,950,176 A | * | 9/1999 | Keiser et al. | 705/35 |
| 5,953,705 A | * | 9/1999 | Oneda | 705/13 |
| 6,012,045 A | * | 1/2000 | Barzilai et al. | 283/67 |
| 6,067,532 A | * | 5/2000 | Gebb | 705/1 |
| 6,240,396 B1 | * | 5/2001 | Walker et al. | 705/26 |
| 2002/0004782 A1 | * | 1/2002 | Cincotta | 705/39 |
| 2003/0236736 A1 | | 12/2003 | Harmon et al. | |

FOREIGN PATENT DOCUMENTS

WO WO 9428496 A1 * 12/1994
WO WO 200075838 A1 * 12/2000

OTHER PUBLICATIONS http://umterps.ocsn.com/marketplace/tickets/tickets-body.html (5 pages).*
ebay.com.*
http://web.archive.org/web/20000817222422/www.uconnhuskies.com/local/uconnclub.html.*
http://web.archive.org/web/19991008201119/pages.ebay.com/aw/misc-index.html.*

* cited by examiner

Primary Examiner—F. Zeender
(74) Attorney, Agent, or Firm—Morgan, Lewis & Bockius LLP; James M. Bollinger; Steven D. Underwood

(57) ABSTRACT

Computer-related methods, apparatus, and/or articles of manufacture to permit/facilitate the creation, marketing, and/or distribution of options to purchase tickets to a particular future event, particularly an elimination format competition, when the chosen competitor's qualification for such a game is currently uncertain, but where the uncertainty will be resolved prior to the commencement of the particular future event.

6 Claims, 8 Drawing Sheets

Figure 1 PARTICIPANTS
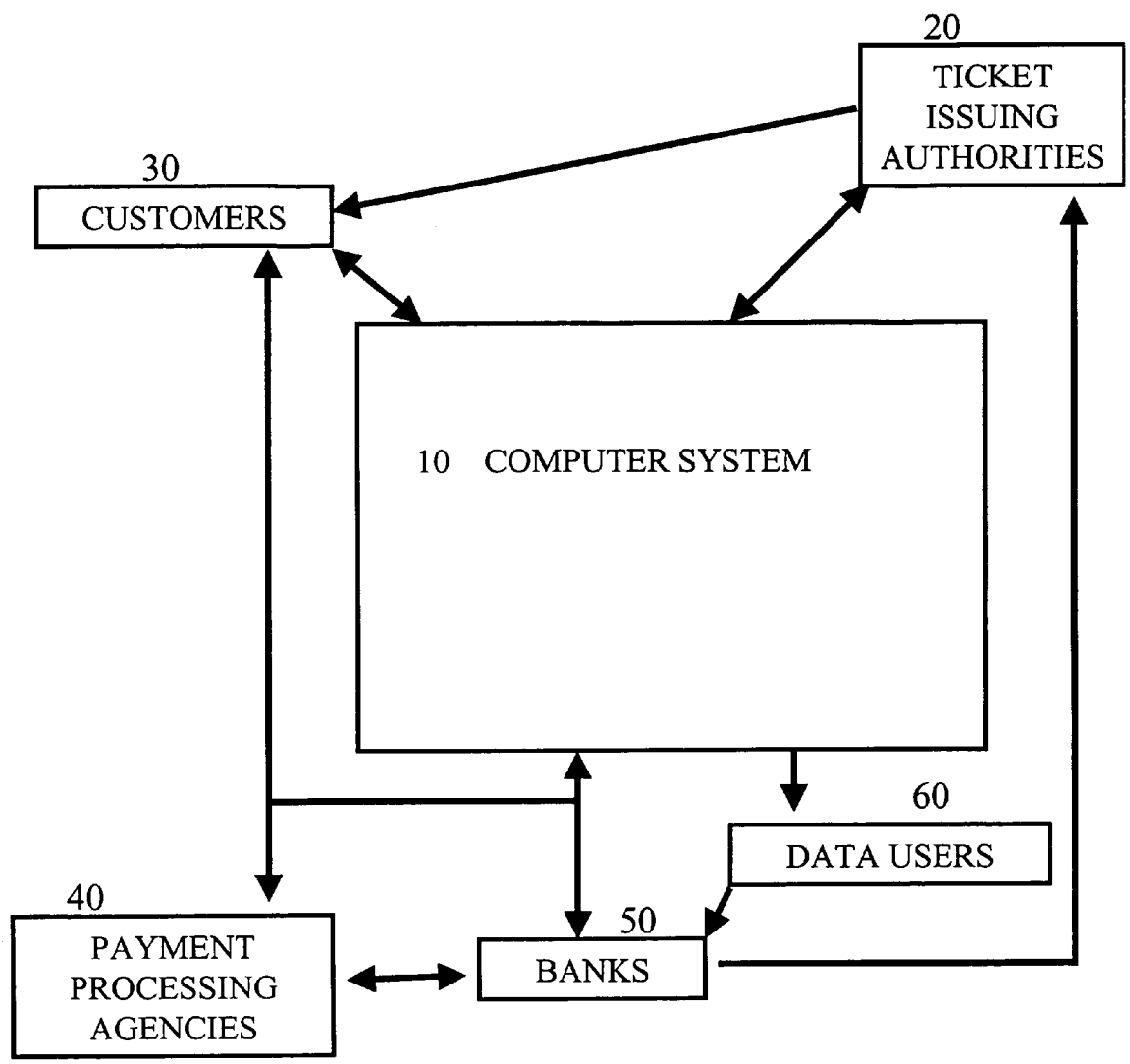

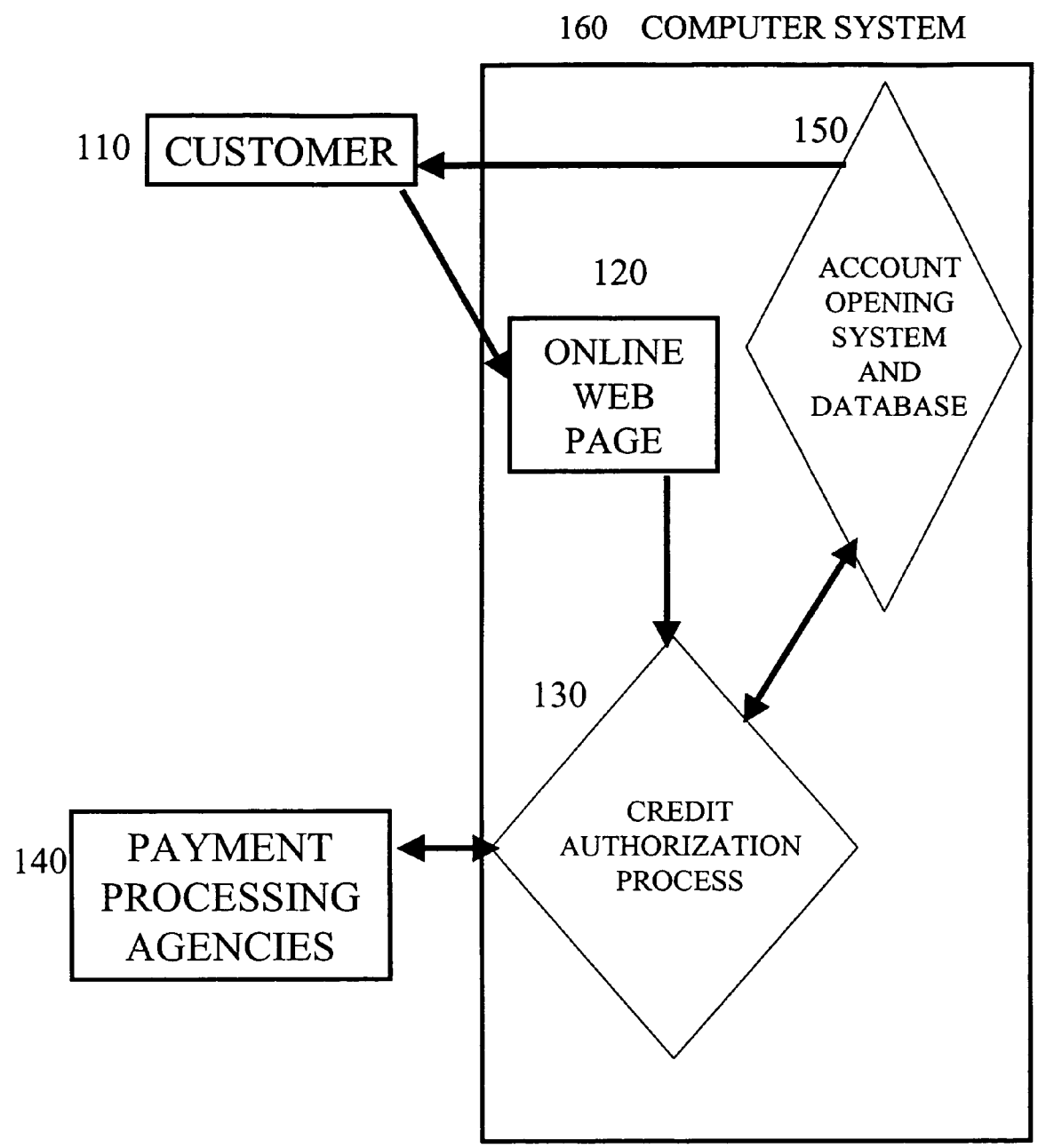
Figure 2 OPENING AN ACCOUNT

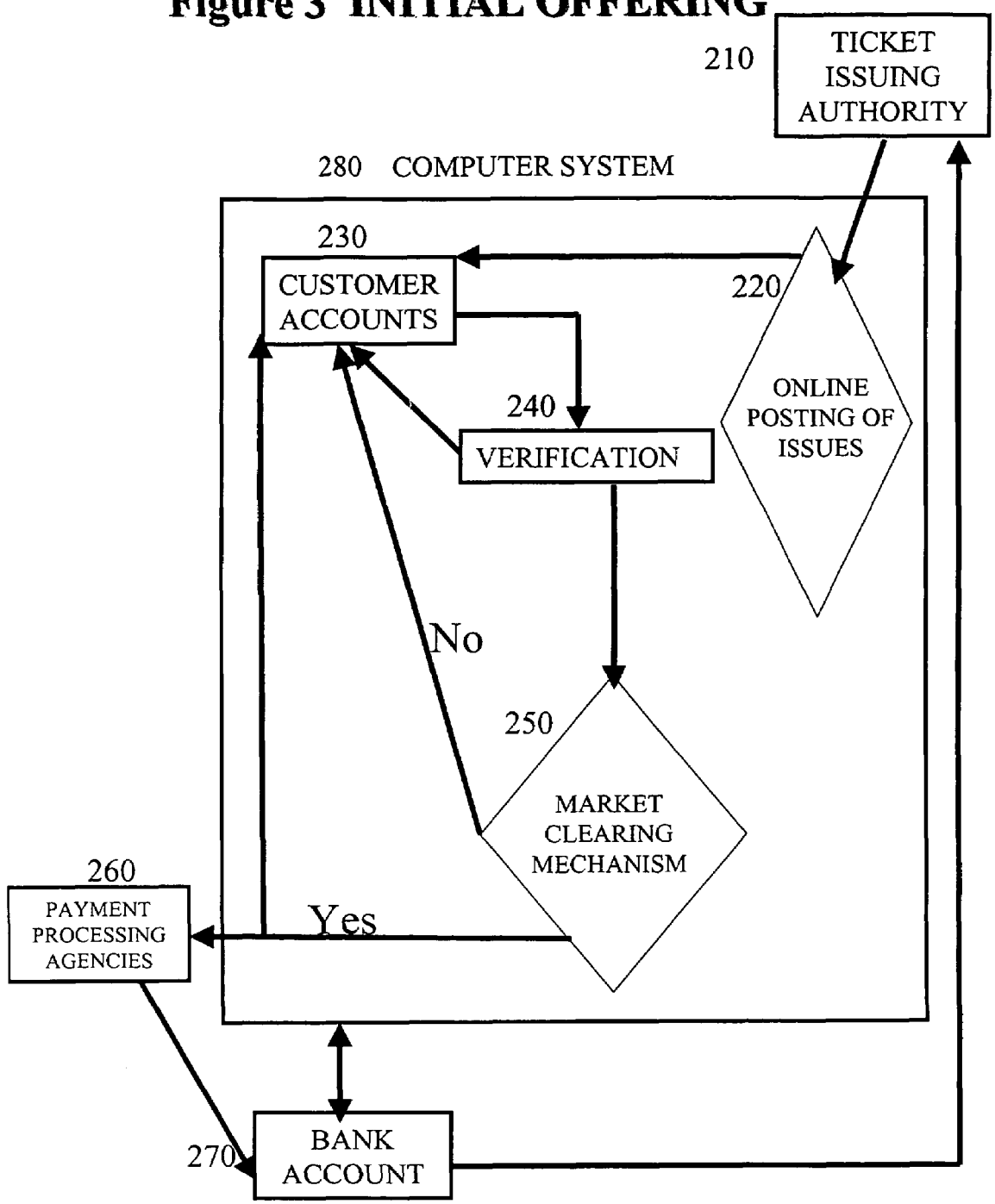
Figure 3 INITIAL OFFERING

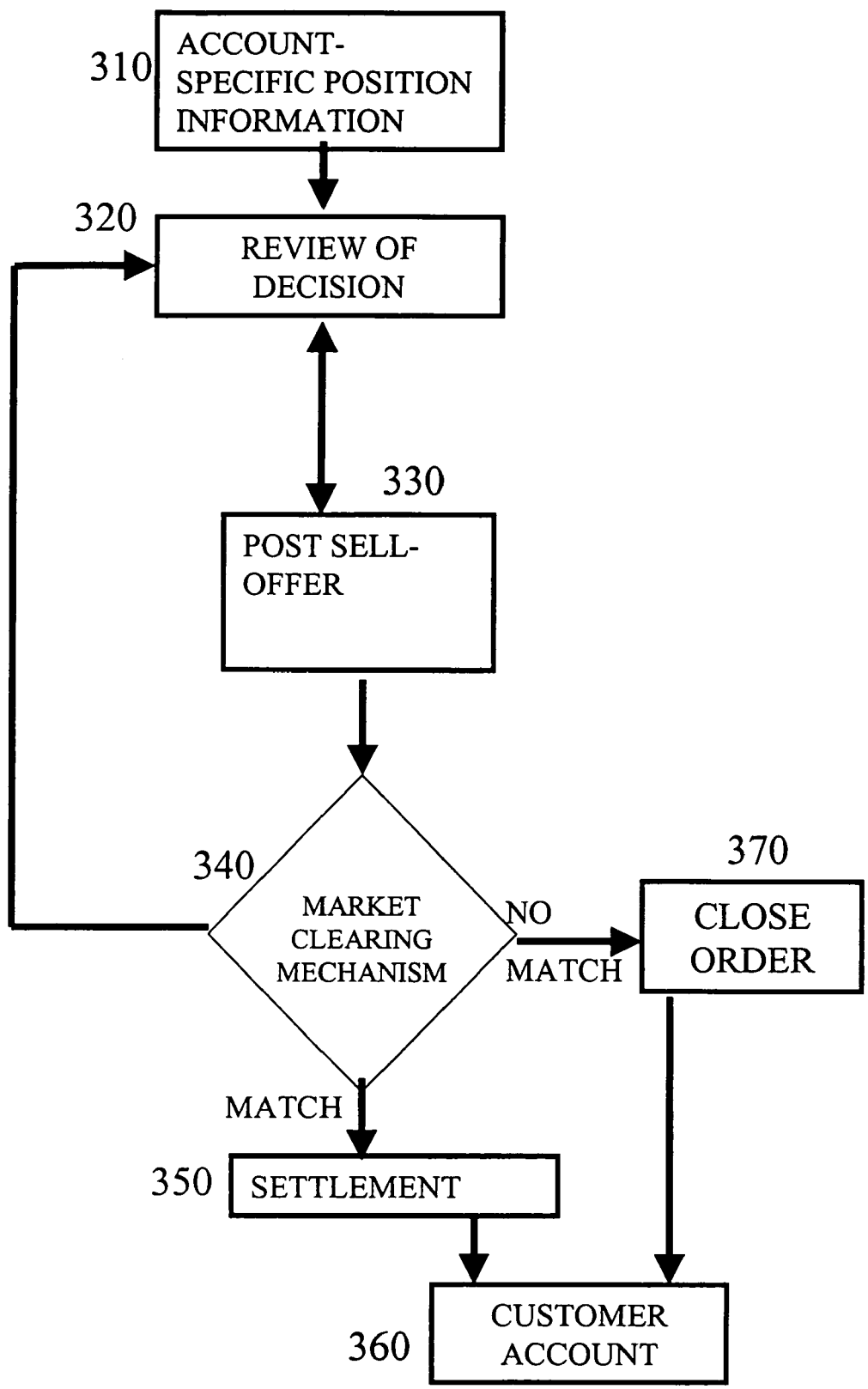
Figure 4. SALES

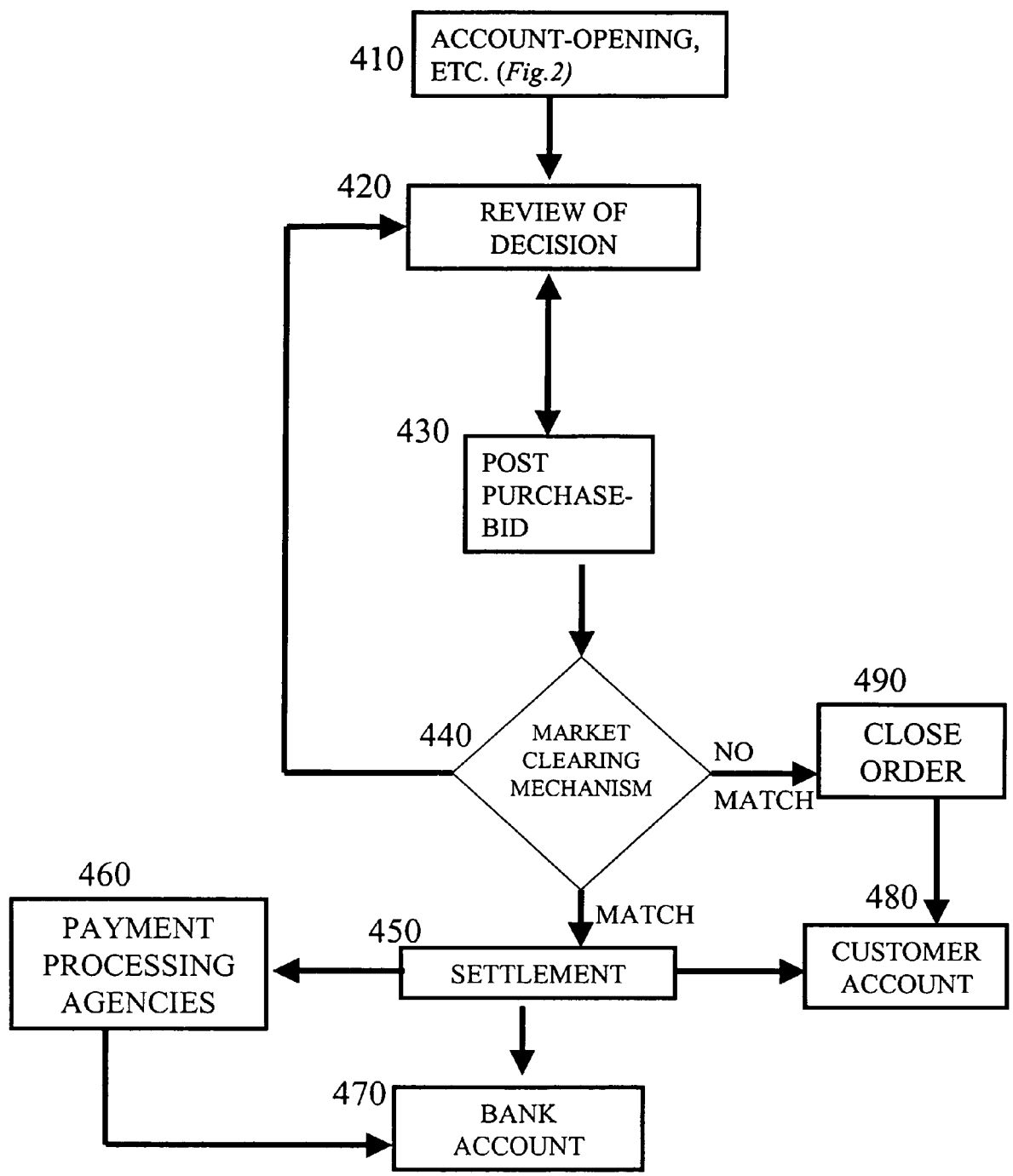
Figure 5. PURCHASES

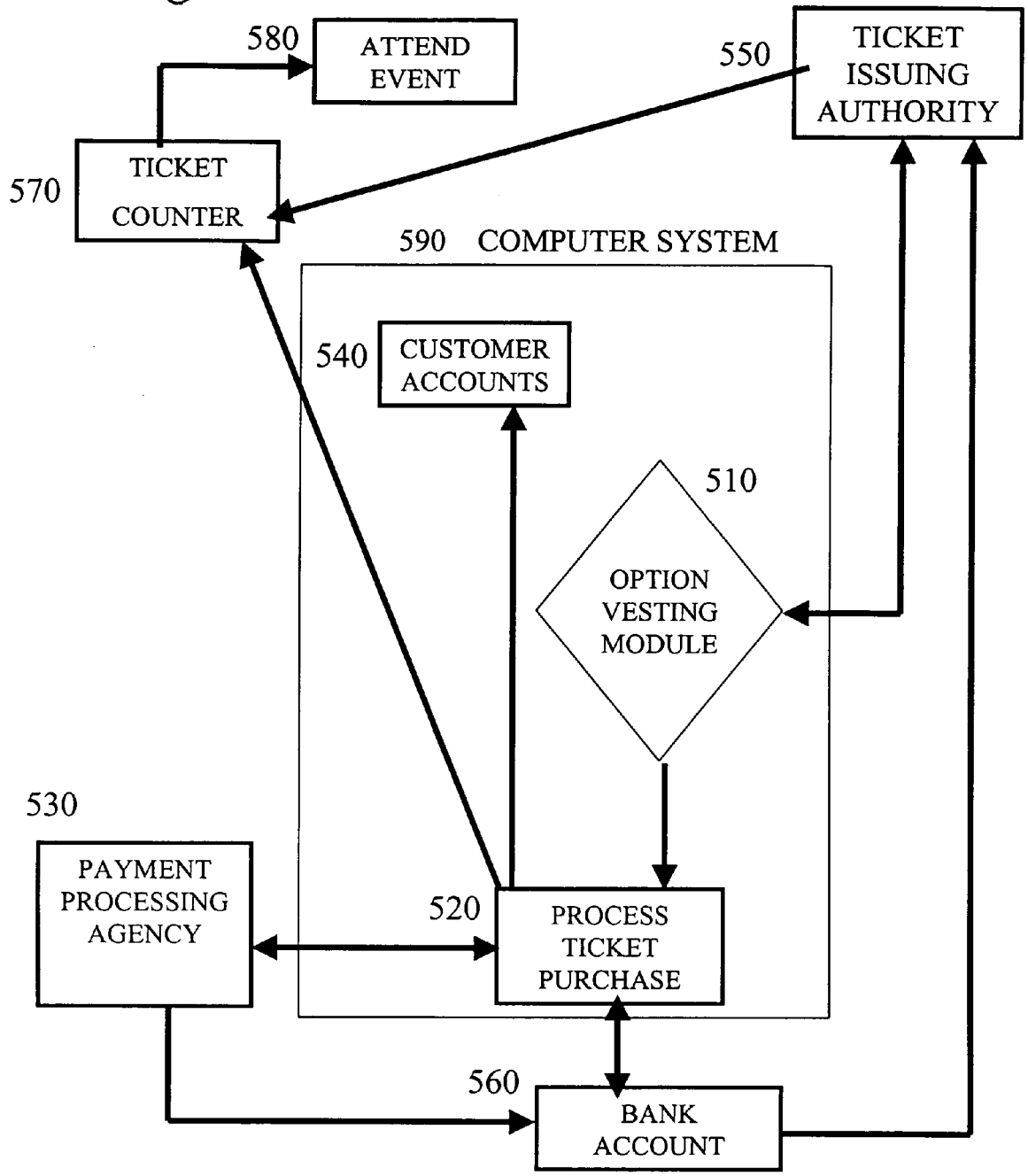

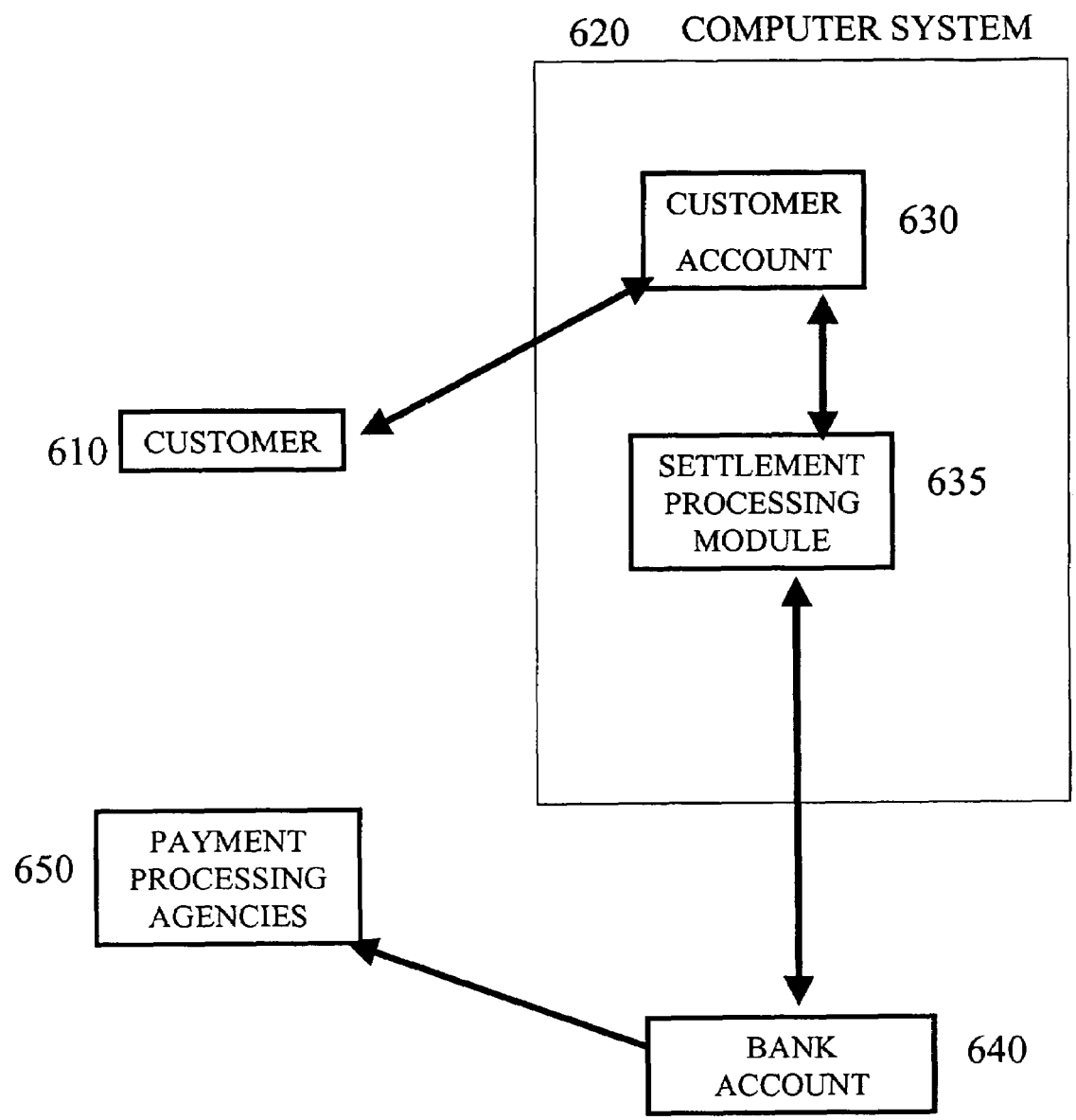
Figure 7 SETTLEMENT

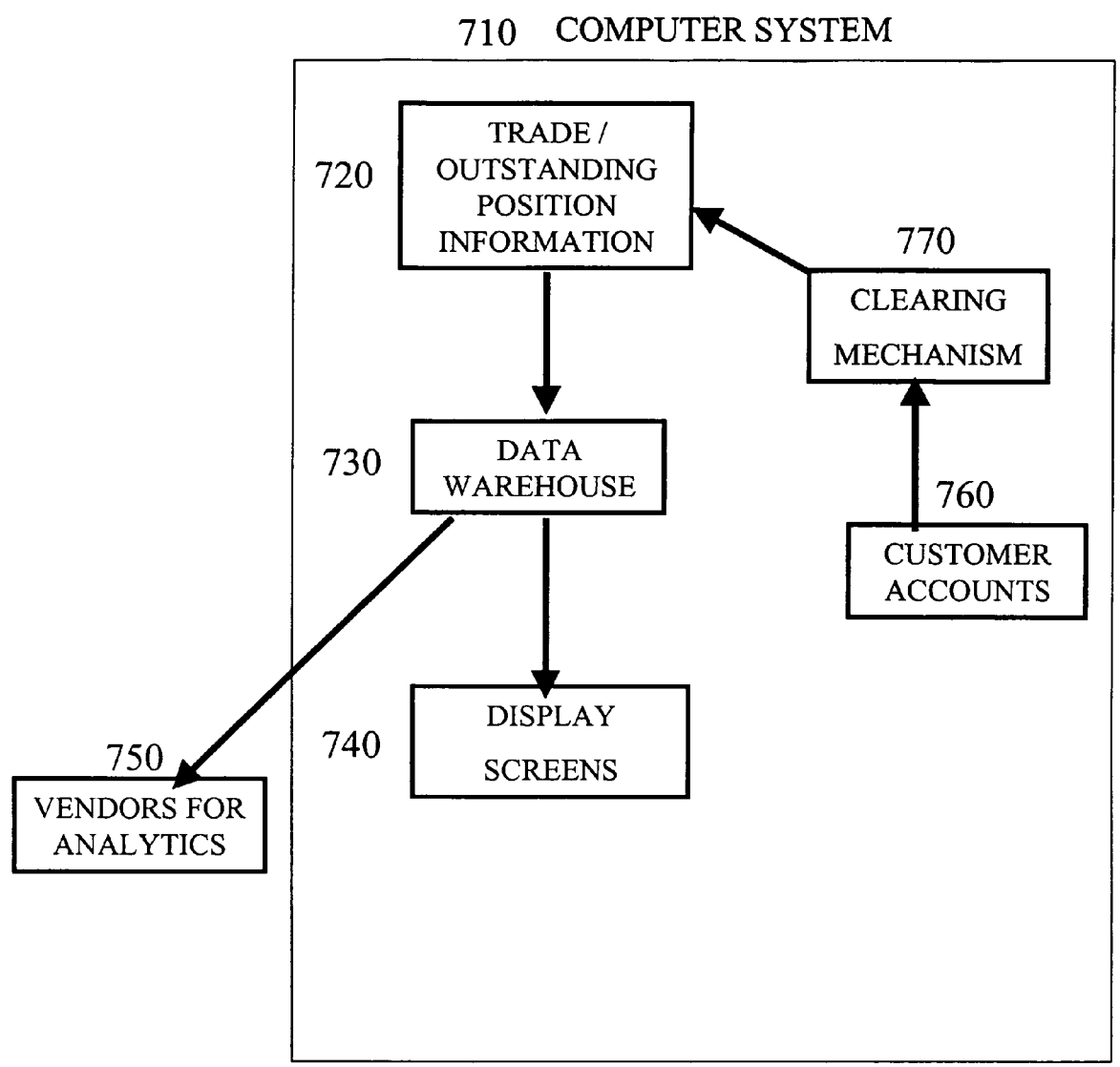
Figure 8. ANALYTICS

METHOD, APPARATUS AND ARTICLE-OF-MANUFACTURE FOR THE CREATION, ISSUANCE, VALUATION/PRICING, TRADING AND EXERCISE OF OPTIONS FOR ATTENDANCE RIGHTS, AND DERIVATIVE INSTRUMENTS THEREON

FIELD OF THE INVENTION

This invention generally relates to the field of computer-implemented business methods and financial instruments; more particularly, the invention relates to a method, apparatus and article-of-manufacture to permit/facilitate the creation of the options to purchase attendance rights (tickets), and derivative instruments on these options, to a particular event and/or subsequent events in an elimination format (or selection based on performance) competition.

BACKGROUND OF THE INVENTION

In almost all events that have an elimination style narrowing of the field or a process of selection of a limited number of participants from a larger pool of participants based on prior performance (e.g., sports competitions), there are a number of problems faced by supporters:

Inability to purchase desired attendance rights in advance: For playoff type events, fans would like to purchase tickets at the start of the season, but since the outcome is uncertain, the authorized ticketing authorities (e.g., team owners) do not offer these tickets until continuation in the tournament is guaranteed (e.g., end of the regular season). Therefore, there is long lead time between when individuals would like to purchase tickets to these subsequent competitions and when such tickets are usually offered.

Requirements to purchase unwanted tickets, merely to guarantee attendance at a particular event of interest: For tournament type events, fans typically have to commit to buying tickets without being sure who the actual competitors would be, with the possibility of the two participants being competitors that the fan has no desire to watch.

Reliance on "scalpers" and other unreliable sources: As the information on who will participate in future rounds evolves, an individual may find that it is more difficult to obtain tickets to these future rounds. Some preference may be given to season ticket holders, but there is normally a long wait list and a greater financial cost to become a recipient of a season ticket. Therefore, individuals are often forced to purchase such tickets through "scalpers," "ticket brokers" or other unsavory characters or risk not obtaining such tickets at all.

Inability to actively manage "ticket availability" risk: For fans willing to absorb the risk of their options never vesting, there is also potentially an advantage to purchasing an "option" to the ticket early on when such uncertainty is great vis-à-vis waiting until there is absolute certainty about the competitor's participation in the chosen event/game. Such "option" could potentially be offered to them at lower cost (i.e., "discounted" in accordance with the probability that the competitor will not qualify for the event). Currently, fans have to wait for the outcome to be finally decided and they risk either not getting a ticket allocation or having to pay a significant premium to scalpers.

Lack of a secondary market: Currently, there is no official secondary market for post-season tickets, so that if individuals cannot attend such events, they are left with the problem of disposing of such tickets themselves.

Moreover, in addition to creating various problems for fans, the current method for selling and distributing elimination- or competition-based attendance rights is not particularly well-suited to the interests of owners/organizers either. Among the problems faced by the event organizers/team owners are:

Absence of an efficient market clearing mechanism: Fan interest in attending these higher round competitions varies depending upon the competitors—i.e., they would want to attend if their favorite competitors advance, but would not necessarily care if their preferred competitors are eliminated. Typically, however, when sporting events reach the point where such fan interest is at a peak (when a team has qualified for the playoffs or the final match-up of a tennis tournament is set), there is a substantial imbalance between the supply of tickets for the games (which is fixed) and the demand for these tickets. Since prices tend to be fixed (by the teams or tournament organizers), there is no efficient market clearing mechanism and tickets are sold on a first-come/first-served basis. There is a considerable unmet demand at this point that is never satisfied by the event organizer and hence goes to waste.

Revenue lost to unexploited demand: As explained above, team owners/event organizers are not maximizing their revenues. Currently, only teams that qualify for post-season play make revenues from such ticket sales. To illustrate this point, in a tournament with 64 players, the organizers can allocate 5,000 seats (or 2,500 seats per optioned contestant) for the final match to options holders. If there were sufficient demand for each of the contestants, the organizers could sell up to 160,000 options on all the contestants, and only 5,0000 of these options will vest. Similarly, in team sports with a playoff style elimination, all teams can issue such options and get some revenue, where currently, no such opportunity exists. In this way, the organizers have captured all the demand available (thereby maximizing revenues), fans have been able to match their needs to the financial cost of satisfying the need, and the event is attended by fans most interested in the event, because the options allow such matching.

Risk that "popular" teams/competitors will be eliminated in early rounds: Under the current system, team owner/event organizers may face financial difficulties if, for example, the qualifying competitors are not popular, or if all the "favorites" are eliminated in the early rounds of competition. In these instances, there may be very little fan interest in the later round(s) of competition—and expected revenues from these rounds may never, in fact, materialize.

Unpredictable revenues, based on performance: Under the current system, team owners (and event organizers) have little, if any, ability to hedge against the risk of poor performance or "upsets"—which may substantially diminish fan interest in the event.

Generally speaking, options represent the right to acquire or dispose a specified asset at a predetermined price within a defined time period. The predetermined price is referred to as the "strike price" and the date on which the option ceases to be effective is called its maturity/expiration date. These parameters, along with the current market value of the underlying asset, largely determine the value of the option. Other factors in the valuation are the volatility of the value of the underlying asset (a measure of the probability that the current value will be favorable vis-à-vis the strike price) and the interest rate (to quantify the carrying cost or the cost of financing the purchase). For a detailed discussion on options, see John Hull "Options, Futures and Other Derivative Securities," Prentice Hall—Chapter 7.

Alternative forms of options have included those that provide a pre-specified payoff when an event occurs during a defined time period. These latter type of options are more in the nature of an insurance policy type of application than a true option. See, e.g., U.S. Pat. No. 4,766,539. [Examples of these are options on bonds that can be purchased by the owner of the option from the seller of the option, at a pre-specified price, should an earthquake occur in a specified area during a specified period of time.]

Options have been used for hedging the risk of changes in the value of the underlying asset or occurrence of event, or for investment and speculation. The option seller, who is willing to make this commitment to the option purchaser, receives the proceeds from the sale of the option and is better off for having been able to sell such rights. Computerized methods for trading traditional futures/options have existed for many years. See, e.g., U.S. Pat. No. 4,903,201, incorporated herein by reference. There have been other applications of options-type instruments beyond financial instruments and commodities, such as options to purchase airline tickets. See, e.g., U.S. Pat. No. 5,797,127, incorporated herein by reference. And, there are currently computer systems that manage the sale and issue of tickets to a variety of events and under various sale conditions, like refundable and non-refundable, fixed terms and changeable terms, and so on. See, e.g., U.S. Pat. Nos. 5,598,477 and 5,953,705, incorporated herein by reference.

However, despite the widespread use of "options" in the prior art, applicant is unaware of any previous use of marketable "options" to assign/distribute attendance rights to tournament- or elimination-style sporting events, especially where vesting of the "optioned" attendance right depends on the final selection of participant(s) in the event in question. Nor is applicant aware of any secondary market for such "options." Thus, at present, significant problems and inefficiencies exist in the selling/distribution of post-season and tournament attendance rights, and there remains a significant need for improved methods, apparatus and articles-of-manufacture to facilitate efficient sale/distribution of such attendance rights.

OBJECTS AND SUMMARY OF THE INVENTION

Accordingly, one object of the present invention relates to computer-related method(s), apparatus and/or article(s)-of-manufacture that solve(s), at least in part, one or more of the above-identified problems with the current system for marketing and distributing attendance rights.

Another object of the invention concerns computer-related method(s), apparatus and/or article(s)-of-manufacture to permit/facilitate the creation, marketing and/or distribution of options to purchase tickets to a particular future event, particularly an elimination format competition, when the chosen competitor's qualification for such a game is currently uncertain, but where the uncertainty will be resolved prior to the commencement of the particular future event.

Still another object of the present invention relates to creation of an online, real-time computer-based system and method to facilitate the initial marketing and valuation of these options, as well as the subsequent trading of these options until their expiration.

A yet further object of the invention relates to attendance right option marketing/trading systems and methods which display the status of a host of options in multiple events, for different stages of competition, and for a multitude of competitors, and which manage a plurality of individual investment/trading accounts, allowing for the purchase and subsequent sale of the displayed options through a payment processing agency (credit card charge or bank facility), payment of revenue share amounts to a ticket issuing authority, a clearing mechanism to manage trades between individuals, charge a transaction fee to the individuals participating, and final payment, if necessary, back to the individuals who may have credit balances if so requested.

Still further objects of the invention relate to computer-based method(s), apparatus and/or article(s)-of-manufacture to store data on all transactions, track current and historical quotes of the various options traded, compute indices that track the investment values represented by various options, compute the relative probabilities that the option prices imply of various outcomes, and provide tools to facilitate option valuation for the participating individuals.

And an additional object of the invention relates to the creation, marketing, trading and valuation of derivative financial instruments based on various attendance right options.

These, and other objects/advantages, are realized, at least in part, by the present invention, the general aspects of which are outlined below.

Generally speaking, and without intending to be limiting, one aspect of the present invention relates to a computer-based method for marketing attendance right options, comprising, for example: storing, in a computer, information related to attendance right options; linking said computer to at least one user terminal through a data communication link; and displaying, at said user terminal, information concerning selected attendance right option(s). "Storing" may include writing said information into a random access memory, writing said information into a magnetic storage device, and/or writing said information into an optical storage device, and may also include storing information identifying a particular attendance right and a current offer or bid for the option to purchase said particular attendance right, storing information identifying a particular attendance right and a current highest bid for the option to purchase said particular attendance right, storing a complete bid history concerning the option to purchase said particular attendance right, storing option expiration information, storing information related to vesting of a particular attendance right option (such as an identification of a particular team or competitor who must qualify for the particular event, an identification of a particular round of play, and/or an identification of home or away status of the particular event). Preferably, each option includes an associated certificate or certification number.

The data communication link preferably includes at least one internet segment, and the linking process preferably includes authenticating the user terminal as an authorized user.

"Displaying" preferably involves use of an internet browser, and includes displaying information identifying a particular attendance right and bid(s) and/or offer(s) on the option to purchase said particular attendance right, information identifying a particular attendance right and a current highest bid for the option to purchase said particular attendance right, a complete bid history for said particular attendance right, a date on which a sale of the option to purchase said particular attendance right will take place, account balance information for the user of said user terminal, option position information for the user of said user terminal, up-to-date option valuation information (wherein the option valuation information is preferably computed from current sports wagering data and/or user-input probabilities concerning option-vesting contingencies), and/or the net profit/loss for positions currently held by the user of said user terminal (wherein net profit/loss is preferably computed from the current bid(s)/offer(s) on positions similar to those held by the user). "Displaying" may further include sending notification to customers regarding the availability of certain specified options through available communication mechanisms (e.g., phone, email, broadcast, letter, etc.)

Other aspect(s) of the invention relate to receiving a command, over said communication link, from a user of said user terminal, which may include a command to purchase the option to purchase a particular attendance right at a previously-displayed offer price, a command to place a specified bid on the option to purchase a particular attendance right, a command to cancel a specified bid on the option to purchase a particular attendance right, and/or a command to place and maintain a bid, higher than the current highest bid, but subject to a limit, on the option to purchase a particular attendance right.

Yet another aspect of the invention relates to receiving bid(s) and/or offer(s) on selected attendance right options, and, optionally, clearing said bid(s) and/or offer(s) through an auction or market clearing process that serves a revenue maximization function for the seller. This may involve a Dutch auction, or an open outcry auction process, or other types of sealed bid/disclosed bid auctions. Further, in matching bid(s) and offer(s), the mechanism may be as simple as pure matching at the highest price and volume levels, or may incorporate more sophisticated ways of clearing the market, like a specialist market maker function or automated closing of the bid offer spread.

BRIEF DESCRIPTION OF THE DRAWINGS

Certain aspects of the present invention are depicted in the accompanying drawings, which are intended to be considered in conjunction with the detailed description below, and which are intended to be illustrative rather than limiting, and, in which:

FIG. 1 is a chart that illustrates various participants and their roles in relation to the invention;

FIG. 2 is a process flow chart exemplifying the opening of an account to facilitate the transactions envisioned in the invention;

FIG. 3 illustratively depicts the flow of information associated with the initial marketing/valuation of options in accordance with the present invention;

FIG. 4 illustratively depicts the flow of information associated with the sale of options held by an account holder in accordance with the present invention;

FIG. 5 illustratively depicts the flow of information associated with the purchase of options by an account holder in accordance with the present invention;

FIG. 6 illustratively depicts the flow of information associated with the exercise of options held by an account holder upon maturity in accordance with the present invention;

FIG. 7 illustratively depicts the flow of information associated with the settlement of the account balance by payment to the account holder in accordance with the present invention; and, FIG. 8 depicts, in block diagram format, several functional blocks associated with the data storage and analytics performed by computer system.

DETAILED DESCRIPTION OF THE INVENTION

Referring to FIG. 1, illustrating the various participants and their interaction envisioned in the present invention, computer system 10 preferably comprises a hub, which manages all the transactions and information flows among the various players. Initially, the ticket issuing authorities 20 feed into computer system 10 various details related to tickets being allocated to the creation of options (e.g., number of seats, location of such seats, different classes of seats and their face values, tentative times and dates for the specific events/games, etc.). Customers 30 interested in these options may access computer system 10, via a communication link (of any sort, including, but not limited to, internet, telephone, cable, wireless, optical, etc.), and open accounts to transact their trades, and will thereafter be able to bid on initial issues of the options as well as sell or buy options going forward. Payments made by customers will preferably be managed through an interface with a payment agency 40 (such as a credit card payment processing company, electronic payment agency or bank). Dues collected will be transferred to a bank account 50, with information feeds back to the payment agency and the computer system, so as to maintain account trading histories up to date. The revenue share of the ticket issuing authorities 20 will also be transferred upon collection from customers. Further, ancillary business may be transacted by third parties 60 using the data within the computer system block 10, thereby yielding additional revenue streams to bank account 50.

In accordance with the invention, an option is preferably an event-strike option with the following characteristics: the individual purchaser of the option acquires the right to purchase tickets at a predetermined price (or the payoff) from the seller of the option, should the competitor on whom they chose the option advance to a pre-specified higher round of competition (or the strike event). The maturity of the option is the date on which it is finally/irrevocably decided whether the competitor progresses or not. If the competitor on whom the option was purchased does not qualify for the specified of competition, the option expires worthless and the owner of the option receives no compensation. The settlement of the option will take place within an appropriate time frame subsequent to maturity and prior to the specified event commencing. The settlement could take place in a number of ways including physical or electronic acknowledgment of ownership of such tickets.

For example, the customer would pick a team/player underlying the option purchased to reach a specified higher level round of competition (e.g., wild-card, quarterfinals, semifinals, up to and including the final round of competition) in the tournament. If that team/player qualifies for the round of competition specified in the option contract, the customer has the right to purchase an attendance ticket from the authorized ticketing body at a given fixed price. The higher round of play could be either a single event elimination or a multiple event series. The customer can purchase the option to any or all games of the chosen round of competition. The invention is applicable to tournaments where there is a regular season that determines qualification for an ensuing play-off contest (e.g., basketball, football, athletics, golf, soccer, cricket tournaments) or to pure elimination style competitions (e.g., match play golf, tennis, figure skating, etc.).

Reference is now made to FIG. 2, which illustrates the opening of an account to facilitate the transactions envisioned in accordance with the invention. Here, customer 110 accesses an online web page 120 to fill out the information required to open an account. This information preferably includes name, addresses, credit card information, dollar limit in the trading account, demographic/personal information and contact information, like email and phone number(s). There are alternative ways to collect this application information, which can be done in writing, over the telephone and through other technologies that are being developed currently (e.g., WebTV, etc.). Once the information is received, the credit authorization process 130 secures a payment authorization from a payment processing agency 140 and blocks out the limit of funds required and requested by the customer. This information is relayed to the database and computer system 150 that manages the account information, which assigns an account number, password and other requisite information and communicates this information back to the customer 110 to facilitate use. Collectively, functional units 120, 130 and 150 are preferably implemented on a single computer system 160, but may alternatively distributed over a number of servers/nodes connected in a network.

Reference is now made to FIG. 3, which illustrates the information flow associated with the initial marketing/valuation of options in accordance with the present invention. Here, ticket issuing authority 210 provides details to computer system 280 regarding the tickets being allocated to the creation of options (e.g., number of seats, location of such seats, different classes of seats and their face values, tentative times and dates for the specific events/games, etc.). These are then posted on the online service 220 (or other information-disseminating facilities that may be developed) so that account-holding customers 230 can access the information they require to decide on the various options they would be interested in through search functionality associated with their accounts. Customers may then, through their accounts 230, post bids on options they are interested in acquiring, with specifications on options pertaining to the underlying competitor chosen, the round of play and potentially the specific games if the playoff is a series playoff, number of seats, and bid price. Verification module 240 confirms that all information is valid and correctly input, and provides confirmation back to the customer on the bids submitted or rejected. Qualified bids are then forwarded to the market clearing mechanism 250, which determines the optimal pricing to match supply and demand. It is envisioned that this will occur through a Dutch Auction, but other auction or bid and offer type matching can easily be adopted. See, e.g., U.S. Pat. Nos. 5,890,138, 5,905,975, 4,674,044, and 5,950,176, each incorporated herein by reference. Also, conditions like minimum price reserve levels and adjustments of volume offered may be allowed to facilitate a revenue maximization objective. See, e.g., previously incorporated '201 patent. For bids that are accepted, there would be a credit card payment process with the payment agency 260, which would then transfer the funds to the bank account 270, from which the revenue share to the ticket issuing authority 210 is remitted. Market clearing mechanism 250 also sends notification to the customer accounts 230 on order status, e.g., orders filled and unfilled, positions, payments received and account balance, if any. This initial offer of options can be made in one offering prior to the beginning of any competitive process or can be made in a series of offerings as the competitive process progresses and the uncertainty of the outcome is lower (thereby increasing the price of the option), but preferably not once the outcome is finally decided.

Reference is now made to FIG. 4, which depicts an illustrative information flow associated with the sale of options held by an account holder in accordance with the present invention. Here, the customer accesses his/her customer account 310 to access the option positions held in the account. The customer may then have access to functionality 320, to review information that helps him/her decide on the details of an intended sale offer. This functionality 320 includes historical transactions (volume and price), valuation tools, other open offers to sell and open bids to purchase. Once this process is completed, the customer will typically post 330 a sell offer. This information is then forwarded to the market clearing mechanism 340. Clearing mechanism 340, as previously described, preferably either matches an open bid to purchase or keeps the posted sell offer open for a defined period of time during which the system attempts to match open sell offers and purchase bids, closing transactions as long as the purchase bids are at least greater than the sell offer, and closing on the lower volume if there is a mismatch. During this period that the sell offer is open, the customer can change its details by looping back to 320 and modifying the offer as necessary. If, at the end of the defined period of time, there are no matched purchase bids for the sell offer, the order is closed 370 and the account position/trade status is updated 360 accordingly. Once the match is performed, the transaction moves to the settlement 350 to complete the transaction, including generating the information necessary to update the account positions, credit the selling customer's account and update 360 his/her account balance.

Reference is now made to FIG. 5, which depicts an information flow associated with the purchase of options by an account holder in accordance with the present invention. This represents the other party to the transaction described above. Here, if the customer does not already have an account, he/she would open an account 410, as described in FIG. 2, and then could proceed to 420, which is similar to 320, as described in connection with FIG. 4. Once this process 320 is completed, the customer will post a purchase bid 430. This information is then forwarded to the market clearing mechanism 440, which processes the bid as in 340 (described in connection with FIG. 4). During the period that the purchase bid is open, the customer can change its details by looping back to 420 and making changes as necessary. If, at the end of the defined period of time, there is no match, the offer is closed 490, and the account position/trade status is updated accordingly. If a match is found, the transaction moves to 450 for the settlement, which involves updating account positions and collection of dues through the payment processing agency 460/470 from the buyer, in a similar manner as laid out in FIG. 3, and updating the concerned account balances 480.

In FIGS. 4, 5 and 6, the market clearing mechanism may take other forms if required to provide liquidity to the marketplace. These would include "marketmaker" functions, open outcry auctions with or without reserve levels, sealed bid auctions etc. Also, bids and offers may be allowed to scale up or down based on customer defined rules to seek matches.

Reference is now made to FIG. 6, which depicts an information flow associated with the exercise of options held by an account holder in accordance with the present invention. Here, in block 510, computer system 590 determines all open option positions that vest (or qualify) for the purchase of attendance rights/tickets and processes 520 the relevant options for ticket purchases. The payment processes related to the ticket purchase (e.g., blocks 530 and 560) is similar to that described in FIG. 3, as is the remittance of the associated funds to the ticket issuing authority (e.g., block 550). Information is also sent (from 520 to 570) as part of the ticket purchase process to facilitate delivery of the tickets, with the necessary information (confirmation numbers, names, etc.) being sent to the ticket counter.

Reference is now made to FIG. 7, which depicts an information flow associated with the settlement of the account balances by payment to account holders in accordance with the present invention. If a customer requests that he/she be paid the account balance in his/her account, the customer account, at 630, is accessed and the balance is verified by computer system 620. Then, either a check is processed and sent to the customer or funds are processed 650 for a credit to the customer's credit card account (in much the same manner as a refund would be processed by a vendor). Also, the customer's account 630 is updated to reflect the appropriate account balance.

Reference is now made to FIG. 8, which depicts certain exemplary functional blocks associated with the data storage and analytics aspects of the present invention; in other words, some of the information that would be captured and stored by the computer system is described. As shown, a position information module 720 contains information on trades, open positions and holdings, which is preferably fed by clearing mechanism 770. Clearing mechanism 770 preferably performs all trades, using information from customer accounts module 760, and feeds resulting data to position information module 720. Up-to-date position information is supplied (by position information module 720) to a data warehouse 730, which can be accessed by custom designed display screens and reports. Further, analytic algorithms and code modules can be run against this warehouse data for the purpose of generating financial derivative instruments on the listed options; and indices and probabilities to quantify the odds of the various competitors reaching the different levels of competition can be generated. These are preferably used to evaluate competitors across the specified competition or across competitions (i.e., either in different locations or across time periods) and even develop comparative rankings. Some of this data can also be sent/sold to vendors 750 interested in these analytics, published for public dissemination, used in contests, etc.

The above described arrangement is largely illustrative of the principles of the current invention. For example, while the illustrative embodiment(s) is/are described in terms of "options" to purchase particular attendance rights, the invention can be alternatively implemented by issuing/marketing "contingent attendance rights"—i.e., an actual attendance right for an event that may, or may not, take place, such as a "second round home playoff game at Texas Stadium." This contingent attendance right is, in effect, the same as an option, but does not require that the ticket issuing authority keep track of vesting and actually issue tickets after the vesting period. Other facilities provided by the creation of these options include the ability to split the rights to post season tickets associated with season ticket ownership. Further, another alternative implementation could be the sale of tickets to such events with a refund option and a refund fee that would de facto be the option price at initial issue. Finally, it is not critical to this invention that a secondary market to trade these options exists. This is a feature that adds functionality useful to customers but the rest of the advantages of this invention are still available to all parties if only the initial issue of options was available.

Other advantages, modifications and adaptations of the invention will be readily apparent to those skilled in the art. For example, the present invention allows fans to buy attendance options well in advance—as early as before the entire competition starts and all the way until the settlement time—before the commencement of the actual event(s) covered by the option(s). Therefore, fans are able to lock-in the ability to purchase attendance rights to certain events under certain desired circumstances (e.g., round of play, competitors, etc.). Option holders can thereafter trade their options (until maturity of the individual options), and continue to do so based on the ongoing performance of the competitors.

Based on the prices of the multitude of options on all competitors and competitions, the present invention also facilitates the development of derivative instruments on these options and indices, and probabilities and statistical measures to quantify the odds of the various competitors reaching the different levels of competition. These can be used extensively to evaluate, among other things, competitors across the specified competition or across competitions (i.e., either in different locations or across time periods).

The present invention preferably—though not necessarily—works in conjunction with fixed price attendance rights/tickets, and allows the options to capture the market premium (or consumer surplus) that supply and demand imbalances would create.

The invention allows all team owners to generate revenues by selling options for potential post-season play, so that there is some potential revenue (no matter how small), even if the team does not qualify. For tournament event organizers in single elimination style competition (e.g., tennis tournaments), the present invention allows for the sale of multiple options on a fixed number of seats, thereby expanding the market size (and hence revenues) significantly. The invention also allows team owners/event organizers to hedge against the uncertainty of future revenues.

Unlike traditional financial options, the options marketed and traded in accordance with the present invention relate to attendance rights to events under very specific circumstances, like defined competitors and round of play. Hence, the outcome (i.e., whether the option will be valuable or "in the money") is uncertain at initial issue and for a large part of the trading period.

Vesting of the options takes place when the chosen competitors underlying the option qualify for the competitive event specified. Such vesting preferably—though not necessarily—produces an obligation to purchase attendance rights/tickets to the specified event at a face value price of those attendance rights/tickets. In traditional options, the vesting takes place over time leading up to maturity, and options are exercised only if they are "in the money" or the strike price is favorable to the price of the underlying asset.

Unlike traditional ticketing systems, which only allow for returns and/or refunds (if at all), the present invention envisions the options either expiring worthless or being converted into the purchase of tickets. Further, a secondary market will be created to allow for the ongoing trade in these options, and to allow subsequent participants to enter and also create liquidity for initial participants.

Thus, the present invention fills a void of unmet market ticket purchaser demand; it provides a product/service that allows the various market participants to interact freely to satisfy such demand; and it simultaneously provides a mechanism that incorporates individuals' subjective evaluation of competitive outcomes to value such products (a price discovery mechanism), and further facilitates the trading of such a product based on an individual's valuation of the option vis-à-vis the rest of the purchasers and sellers (i.e., the marketplace). The present invention also facilitates the hedging risks. For example, in some competitive events, the individual must purchase tickets today for future rounds, without the knowledge of who the participants may be. As the competition evolves, a ticket holder may be less interested to see a certain round of competition and would like to hedge against this risk. If he/she has purchased tickets for a particular round of competition, he/she could potentially sell an option on his/her ticket should a competitor he/she dislikes be a competitor in that round. However, another individual may have exactly the opposite desire, and may want to be cautious about spending the entire cost of the ticket on the day tickets go on sale, as he/she may like the competitor that the current holder of the ticket dislikes, but think that that competitor has a low probability of advancing. The invention facilitates the matching of these two desires to create an efficient, market-driven outcome.

What is claimed is:

1. A method for distributing rights to attend a future event, said method implemented on a computer system, the method comprising the steps of:
   storing on a first computer, information on one or more future events, said future events are events at which spectators pay to view activities and that have restricted attendance for a fee, said stored information includes details regarding said future event and comprises details regarding an offer to sell contingent rights, said contingent rights provide a right to purchase access at a specified price to said future event upon the occurrence of a future outcome that is uncertain at the time of said offer;
   providing a communication link to said first computer to allow potential contingent rights purchasers to access said information associated with said contingent rights offer; and
   selling, either as a principal or on behalf of a third party, said contingent rights to one or more third parties that accept said offer.

2. A method as in claim 1, further comprising distributing said right to purchase access to said future event upon the occurrence of said future outcome.

3. A method as in claim 1, wherein said future outcome comprises qualification of one or more participants for said future event.

4. A computer based method for distributing transferable rights to purchase tickets, the method comprising the steps of:
   storing, in a computer linked to a computer network, information identifying a transferable right to purchase one or more tickets to a sporting event, wherein said right to purchase becomes executable only if one or more specified potential participants qualify for said sporting event;
   transmitting, over said computer network to a plurality of computers, an offer to sell said transferable right to purchase; and
   receiving, over said computer network, an acceptance of said offer; whereby said transferable right to purchase is sold pursuant to said acceptance of said offer.

5. A method as in claim 4, wherein said transferable right to purchase comprises a contract.

6. A method as in claim 4, wherein said offer to sell is for a price below a face value of each ticket that a purchaser of said transferable right to purchase has a right to purchase under said right.

* * * * *